Oct. 3, 1944.   A. R. FLINK   2,359,412
DISTRIBUTOR TRUCK
Filed Aug. 6, 1941   7 Sheets-Sheet 1

Inventor:
Allen R. Flink,
By McCaleb, Hendl & Perry Dickinson,
Attorneys.

Oct. 3, 1944.   A. R. FLINK   2,359,412
DISTRIBUTOR TRUCK
Filed Aug. 6, 1941   7 Sheets-Sheet 2
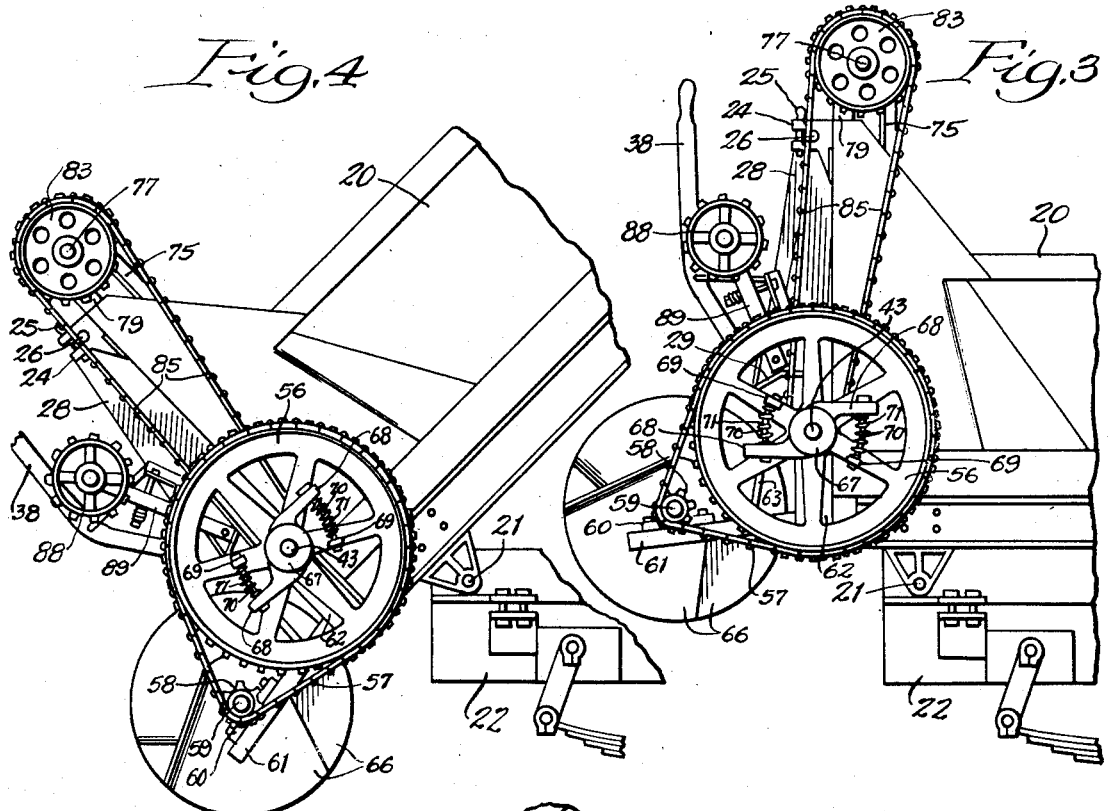
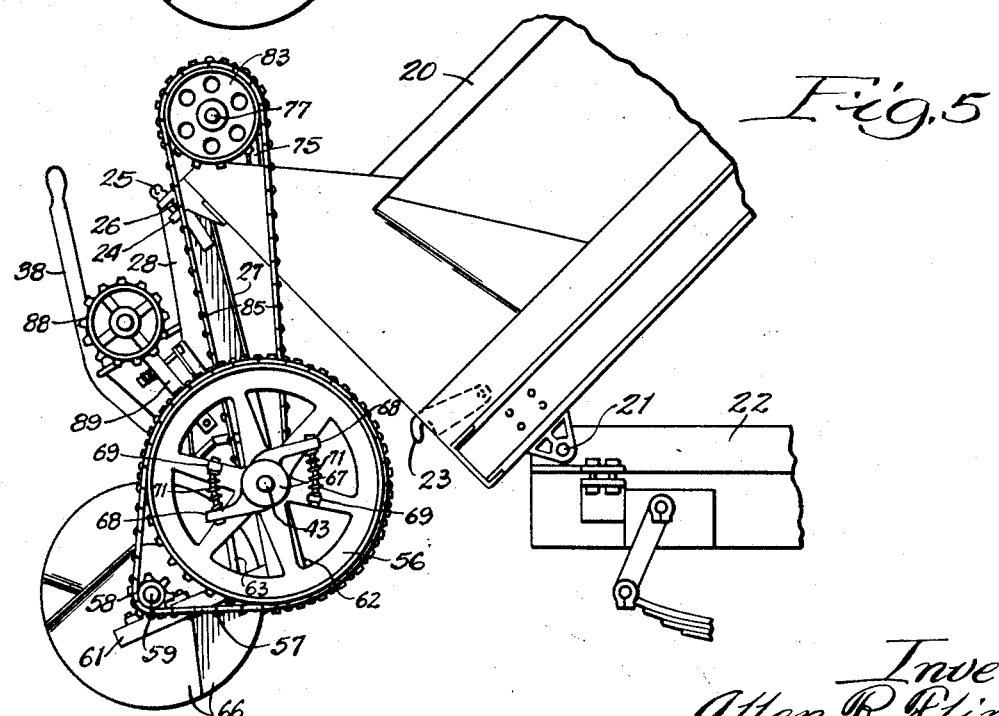
Inventor:
Allen R. Flink,
By McCaleb, Hendricks & Dickinson
Attorneys.

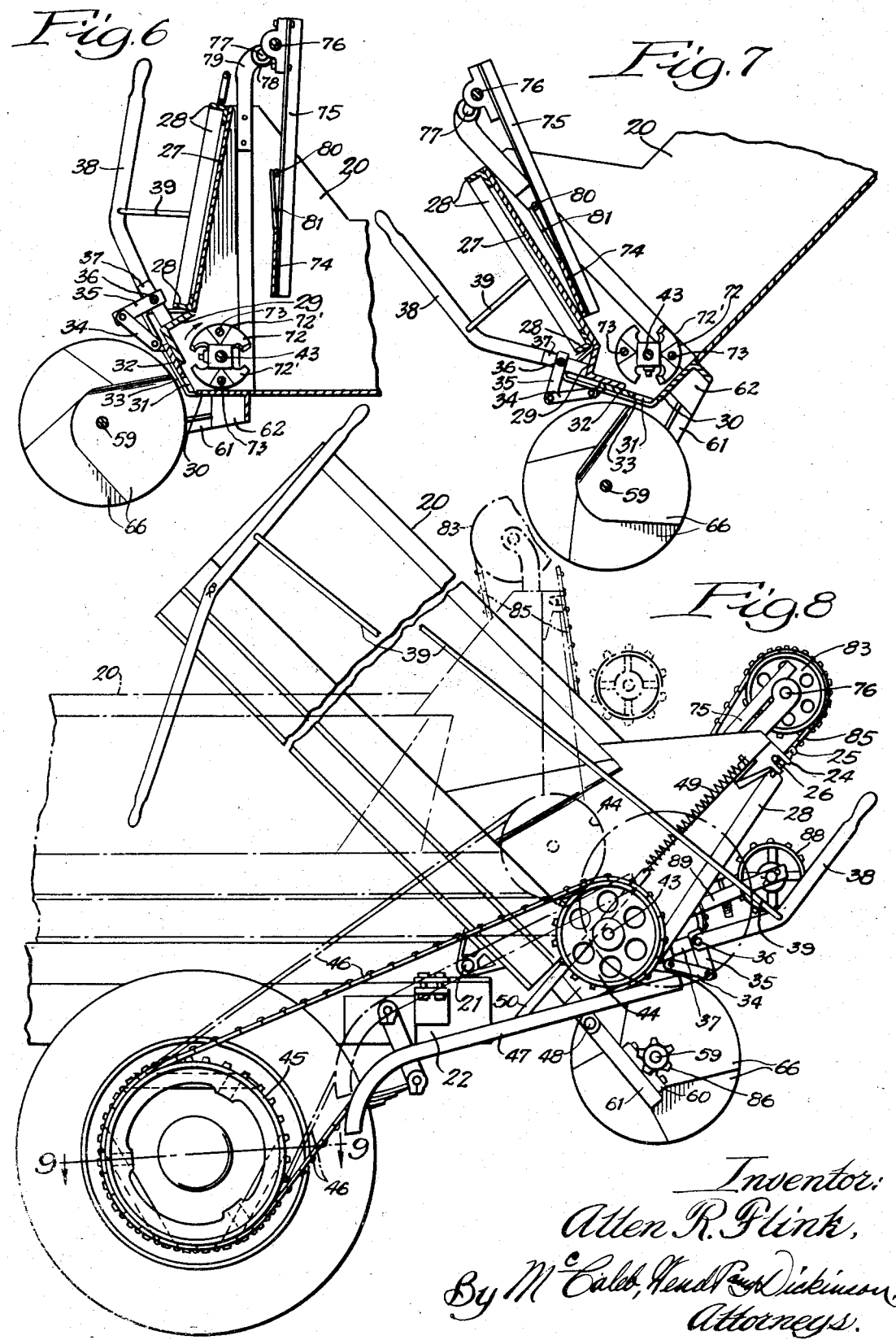

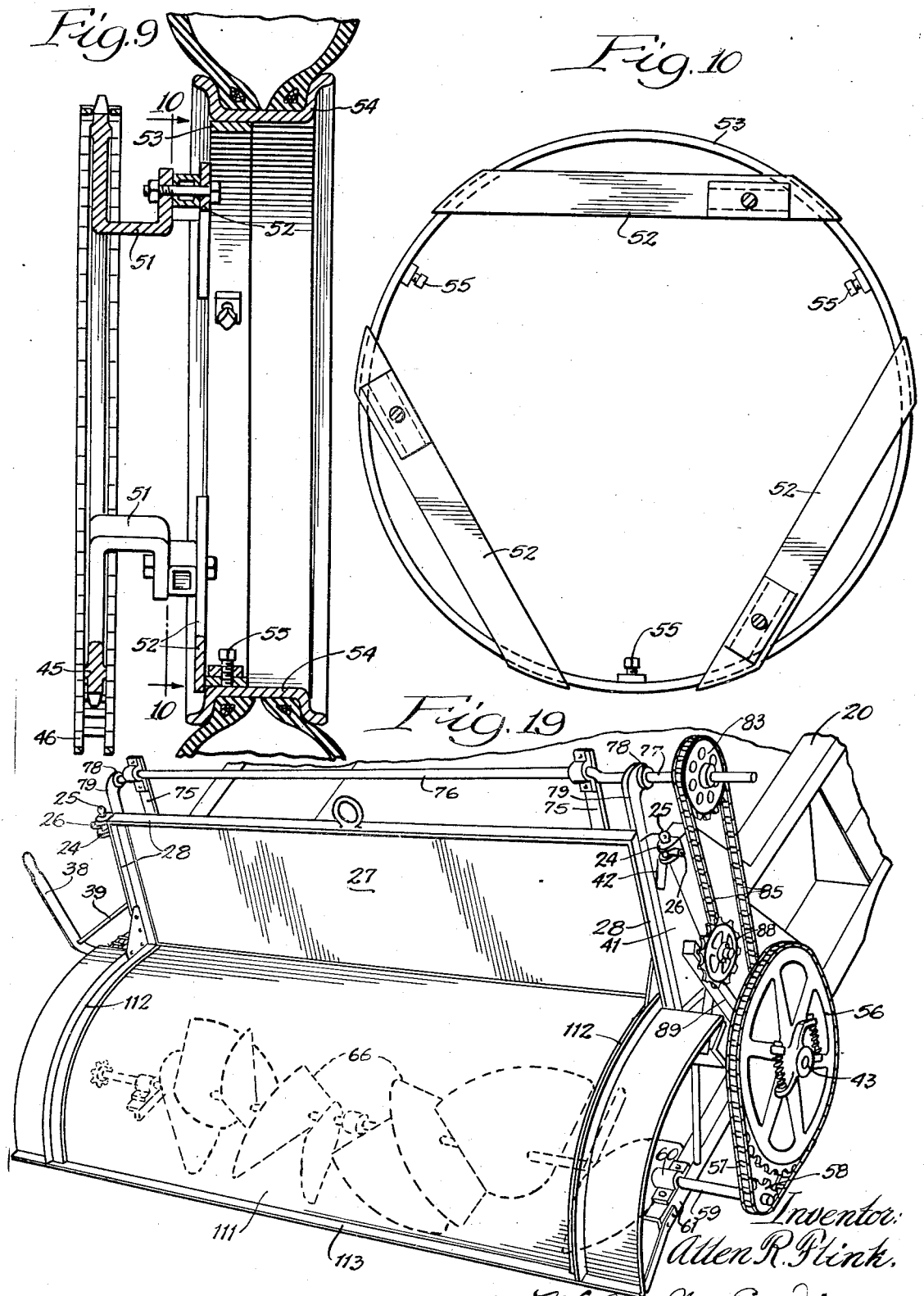

Oct. 3, 1944.   A. R. FLINK   2,359,412
DISTRIBUTOR TRUCK
Filed Aug. 6, 1941   7 Sheets-Sheet 5

Inventor:
Allen R. Flink,
By McCabb, Hendry & Dickinson,
Attorneys.

Oct. 3, 1944.     A. R. FLINK     2,359,412
DISTRIBUTOR TRUCK
Filed Aug. 6, 1941     7 Sheets-Sheet 6
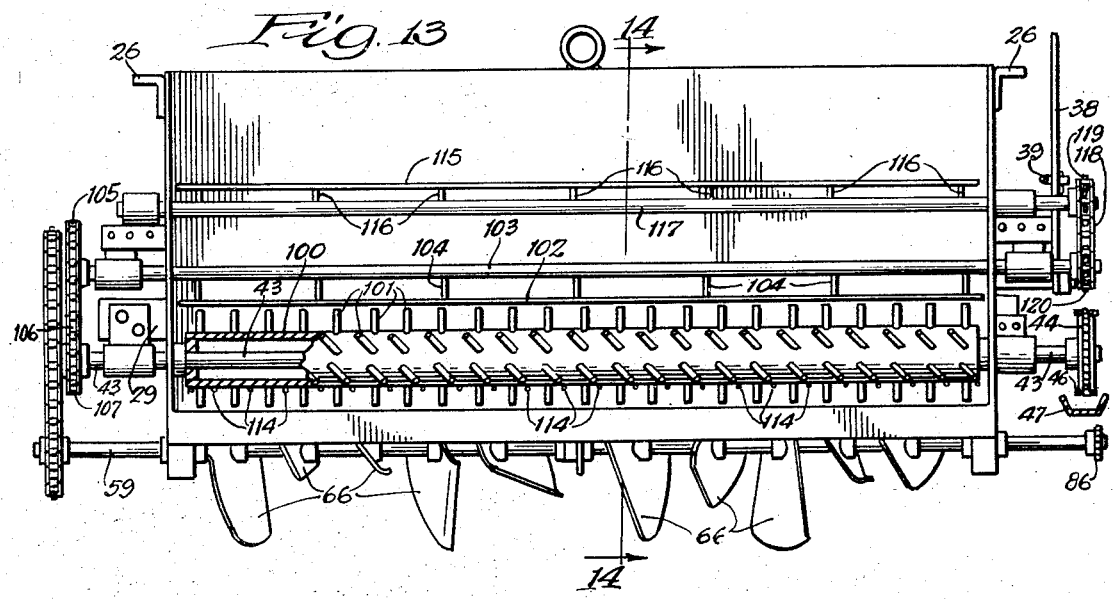
Inventor:
Allen R. Flink,
By McCaleb, Wend Ray Dickinson
Attorneys.

Oct. 3, 1944. A. R. FLINK 2,359,412
DISTRIBUTOR TRUCK
Filed Aug. 6, 1941 7 Sheets-Sheet 7
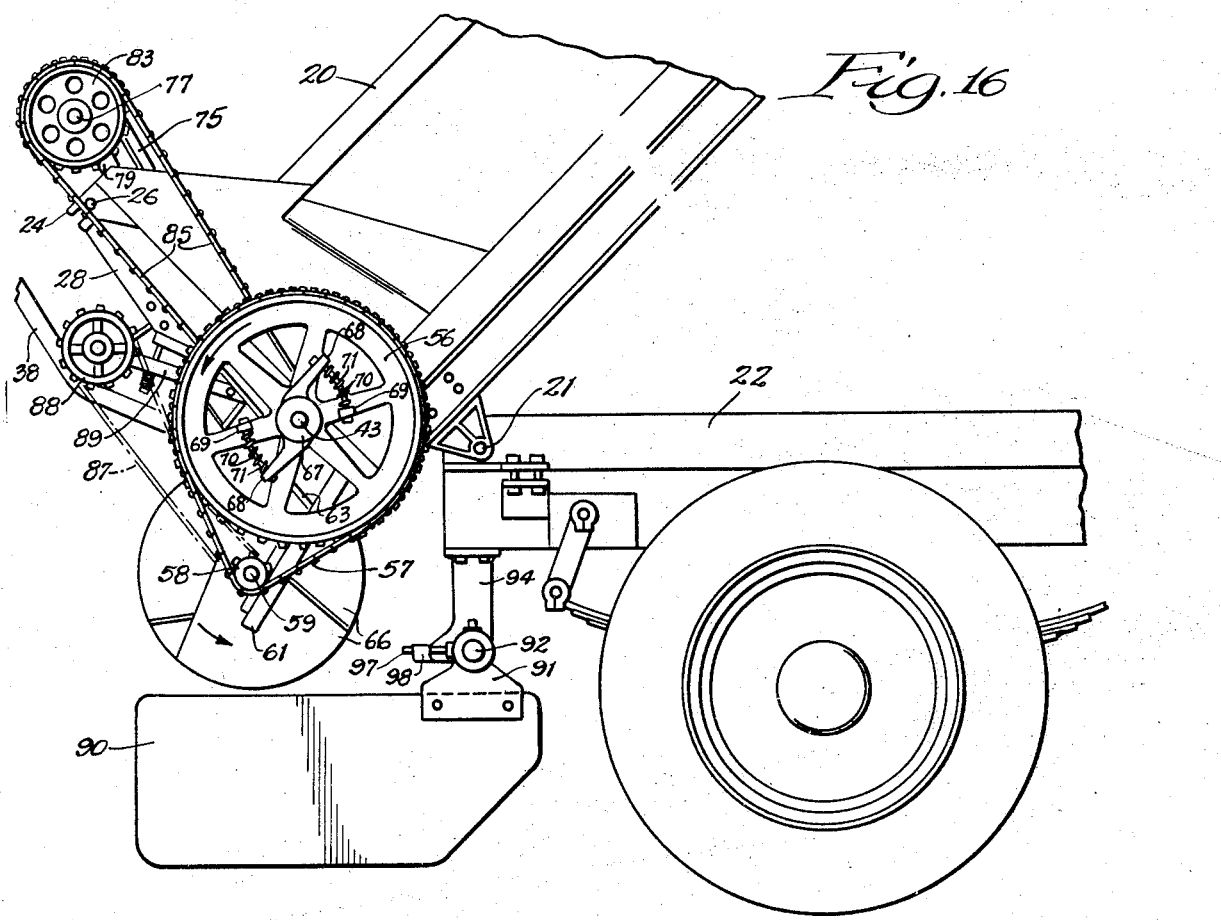
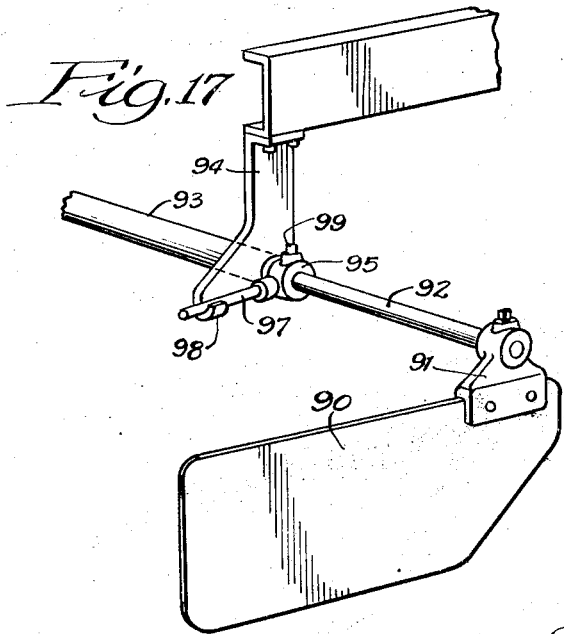
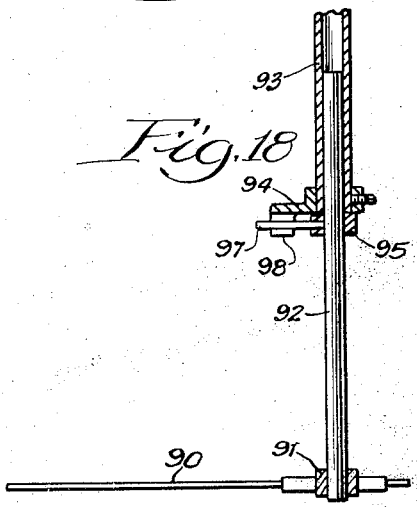
Inventor:
Allen R. Flink,
By McCabb, Hend Van Dickinson
Attorneys.

Patented Oct. 3, 1944

2,359,412

UNITED STATES PATENT OFFICE 2,359,412

DISTRIBUTOR TRUCK

Allen R. Flink, Streator, Ill.

Application August 6, 1941, Serial No. 405,637

19 Claims. (Cl. 275—2)

This invention relates to improvements in trucks, particularly trucks intended for the transportation and distribution of finely divided, ground and pulverulent material, such as ground limestone, lime, ground phosphate, sand, and the like, and also of relatively soft mineral and fibrous material, such as marls, clays, manure, and the like.

One of the objects of the invention is to provide a dump truck provided with distributor mechanism which may be removably applied to the truck in substitution for the rear gate or door thereof.

A further object of the invention is to provide an improved power connection means whereby such a distributor may be operatively connected to the wheels of the truck.

A further object of the invention is to provide a distributor which is adapted to be substituted for the conventional door of the truck and which is adapted to be used as a gate as well as a distributor.

A further object of the invention is to provide an improved distributor for finely divided, granular, and pulverulent materials and for relatively soft materials.

A further object of the invention is to provide an improved distributor which is adapted for broadcasting material to either side of the truck and also for broadcasting the material in a circumscribed area.

Other objects, advantages and capabilities of the invention will appear from the following description thereof taken in conjunction with the accompanying drawings, in which:

Fig. 3 is a side elevational view of my improved distributor, the truck being in normal load-carrying relation;

Fig. 4 is a similar view showing the body in dumping relation;

Fig. 5 is a similar view showing my improved distributor in use as a gate for ordinary transportation and dumping of material;

Fig. 6 is a sectional elevation through my improved distributor, the section being taken on the line 6—6 of Fig. 2;

Fig. 7 is a similar view with the body in dumping position;

Fig. 8 is a side elevation of the rear end of a truck equipped with my improved distributor and showing the manner in which the distributor is connected to the wheels of the truck;

Fig. 9 is a sectional plan view taken on the line 9—9 of Fig. 8 showing the manner in which the drive element is connected to a conventional wheel truck;

Fig. 10 is a sectional detail view taken on the line 10—10 of Fig. 9 showing the structure of one of the attaching means;

Fig. 13 is a view similar to Fig. 11, showing a modification of my distributor, adapted for the spreading of marl and similar material;

Fig. 14 is a sectional view showing this modified distributor in operative condition, the section being taken on the line 14—14 of Fig. 13;

Fig. 15 is a view similar to Fig. 14, showing still a further embodiment of my invention, being particularly a distributor adapted for the spreading of manure and other fibrous material;

Fig. 16 is a side elevation of my improved distributor provided with means for limiting the lateral distribution of material and intended particularly for distributing sand, gravel, and other materials upon roads;

Fig. 17 is a perspective detail of the shield mounting shown in Fig. 16;

Fig. 18 is a plan view of the mechanism shown in Fig. 17; and

Fig. 19 is an elevational view of a modified distributor intended particularly for distributing phosphate and other very finely divided material.

Figure 1:
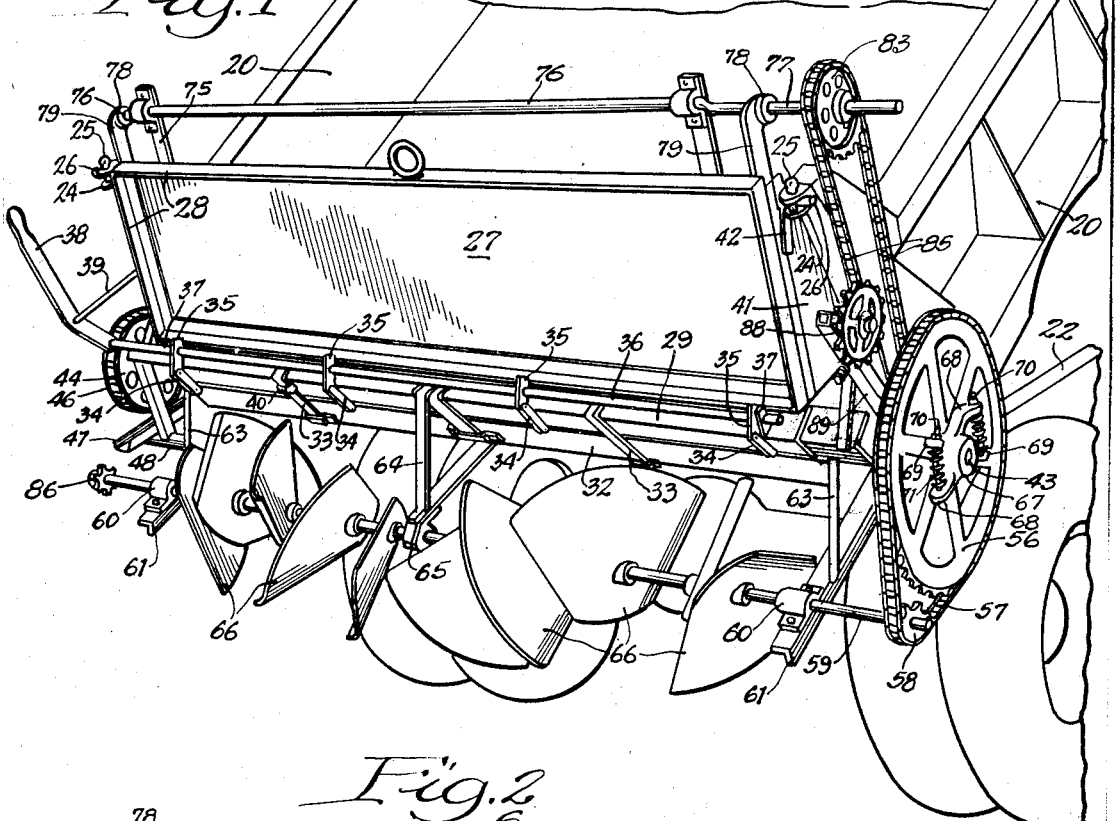
Fig. 1 is a perspective view of the rear end of a truck equipped with a distributor embodying my invention.
Figure 2:
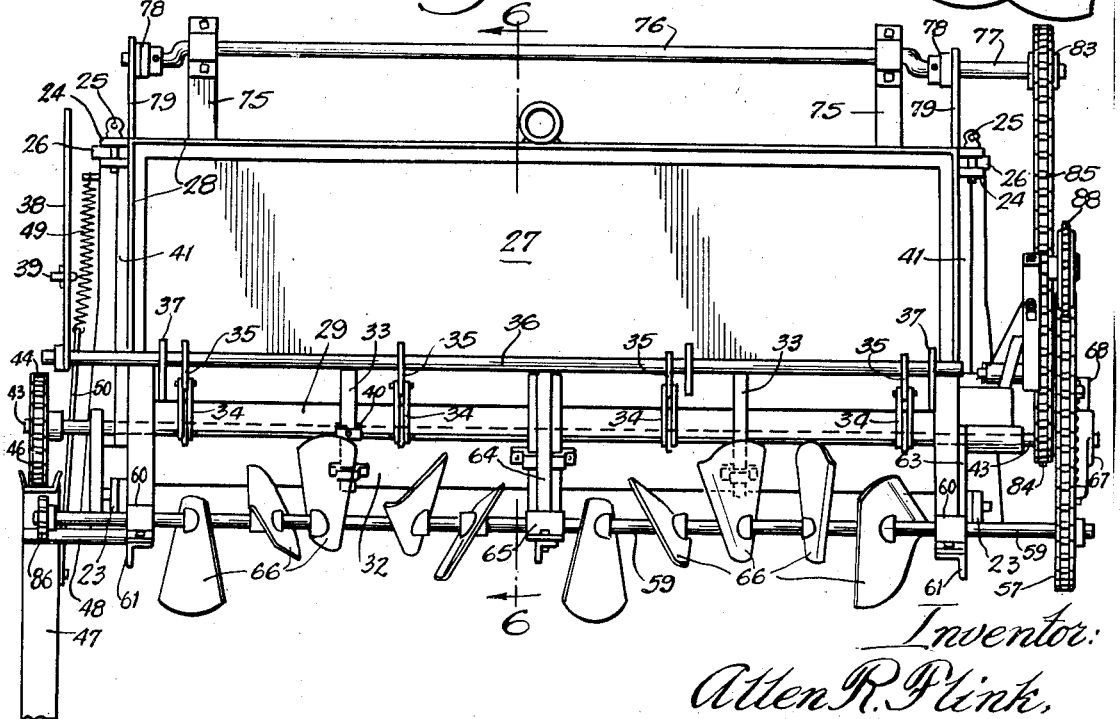
Fig. 2 is a rear elevational view thereof.

Referring to the drawings, the reference numeral 20 designates the body of a truck which is pivotally mounted at 21 upon a chassis 22. This truck may be any conventional truck such as is used for farm and other commercial purposes. Such trucks are ordinarily provided with hoists whereby the truck load may be dumped, the body 20 being swung up about the pivots 21. Ordinarily such trucks are provided with gates which are held latched by latches 23 (Fig. 5), the gates being provided with trunnion members which are received in brackets 24 mounted at the ends of the side walls of the body, these trunnion members being held in the brackets 24 by means of removable pins 25.

My improved distributor is provided with trunnion members 26 (Fig. 5) which are received by the brackets 24 and are held in place by the pins 25 just as is the conventional truck gate. The distributor is engaged by the latches 23 and for normal distributing purposes these latches remain engaged. When, however, it is desired to use the distributor as a conventional gate for transporting loads which are intended to be dumped rather than distributed, then the latches 23 may be opened and the load may be dumped in the manner shown in Fig. 5, the distributor falling away from the rear end of the truck just as does the conventional gate. It is, therefore, possible to substitute my improved distributor upon the rear end of a truck and thereafter to use the truck as a distributor or to use the truck in normal fashion as a dump truck.

My improved distributor comprises a main portion which serves as a closure for the rear end of the truck. This portion includes a panel 27 which extends downwardly and slightly rearwardly, as shown in Fig. 6. This panel is reenforced by a frame 28. Rigidly secured to the panel 27 is an angular structure 29, the lower edge of which is directed downwardly and forwardly and is in spaced relation to a normally horizontal wall 30 which in normal relation is located in alignment with the bottom of the body of the truck.

The space between the angular member 29 and the bottom member 30 is designated by the reference numeral 31 and this space serves to provide a slot for the escape of the material to be distributed. The slot may be closed and its effective area may be adjusted by means of a sliding plate 32. When it is desired to close the slot 31, the plate 32 is slid downwardly on guides 33 until it bridges the space between the angular member 29 and the bottom member 30.

The sliding plate 32 is moved along the guides 33 by means of a plurality of links 34 which are pivotally connected to the plate 32 and two arms 35 which are rigidly mounted upon a shaft 36. The shaft 36 is rotatably mounted on brackets 37 which extend upwardly from the angular member 29. At the left-hand side of the truck the shaft 36 carries a hand lever 38 whereby the shaft may be actuated to open or close the slot 31.

The hand lever 38 has pivotally connected thereto a link 39 which extends up to the front of the truck into a position adjacent the driver so that the opening or closing of the slot may be controlled by the driver without it being necessary for him to come out of the cab. It will of course be understood that the forward end of the link 39 may be provided with a forward hand lever which is similar to the hand lever 38, which forward hand lever may be pivotally mounted on the truck body.

One or more of the guides 33 may be provided with a suitable stop 40 which is adjustable in position thereon so as to limit the degree of opening of the slot 31 for the particular material being distributed.

My distributor comprises generally triangular wall elements 41 at each side of the truck body, these wall portions being located to serve as continuations for the side walls of the truck. The triangular wall portions 41 are integrally connected to the panel 27, the angular portion 29, and the bottom wall 30 to constitute a box-like structure which is, in effect, a small extension of the rear end of the truck. Upon the side wall portions 41 are rigidly mounted brackets 42 which carry the trunnion members 26 previously referred to.

A shaft 43 extends through the box-like structure of the distributor near the bottom thereof, this shaft being provided with bearings in the end wall members 41. At one end, the left-hand end in the embodiment shown, the shaft 43 has mounted thereon a sprocket wheel 44 which is in alignment with a sprocket wheel 45 rigidly mounted on the adjacent rear wheel of the truck.

A chain 46 extends around the sprocket wheels 44 and 45 when it is desired to distribute the material in the manner shown in Fig. 8. When the distributor is not intended to be operating, for example during long hauls of the material, the chain 46 is preferably removed. It is pointed out, however, that the chain 46 does not need to be removed in order to move the body from dumping to normal position, or vice-versa. The position of the chain and body is shown in full lines in Fig. 8 to designate the distributing position and on the same figure these elements are shown in dot-and-dash lines to designate a transporting position.

For ease of application and removal, the chain 46 is preferably rather long and, in order to take up the slack during operation, I prefer to provide a resiliently mounted member 47 which bears against one length of the chain 46 in the manner shown in Fig. 8.

The member 47 is preferably in the form of a trough through which the chain 46 is adapted to slide. The channel member 47 is pivotally mounted on a rigid member 48 carried by the framework of my distributor, and is biassed upwardly by a spring 49 which is connected to it by means of a link 50.

The manner in which the sprocket wheel 45 is mounted on the rear wheel of the truck is best shown in Fig. 9. The sprocket wheel 45 is provided with inwardly extending bracket members 51 which may be three in number. These bracket members are rigidly bolted to three chord members 52 which are rigidly connected to an annular member 53. This annular member is adapted to fit inside the rim 54 of a standard truck wheel in the manner shown in Fig. 9.

Three set screws 55 are mounted in radial relation on the ring member 53. To assemble the sprocket wheel 45 on any particular truck wheel, it is merely necessary to locate the annular member 53 inside the rim 54 in the manner shown in Fig. 9 and tighten the set screws 55. Removal of the sprocket wheel 45 is the work of a moment, it being merely necessary to loosen the set screws 55 and pull the sprocket wheel assembly out of the rim 54.

To connect the sprocket wheel 45 to the sprocket wheel 44, it is merely necessary to pull the member 47 downwardly and rearwardly against the tension of the spring 49, to locate the chain 46 on the sprocket wheels 45 and 44, and then to release the member 47 so that it bears against the chain 46.

At its opposite end, that is the right-hand end, the shaft 43 carries the sprocket wheel 56. As shown in Fig. 1, a chain 57 extends around the sprocket wheel 56 and around a small sprocket 58 carried by a shaft 59. The shaft 59 extends across the rear end of the truck and is rotatably mounted in bearings 60 carried by arms 61 which extend rearwardly from downward extensions 62 of the side wall elements 41 as is best seen in Figs. 6 and 7. It will, of course, be understood that the arms 61 may be rigidly secured to the stationary framework of my distributor by means of bracing members 63 and other rigid supports such as the bracket 64 which provides an additional bearing 65 for the shaft 59.

The shaft 59 carries along its length a plurality of distributing blades 66 which are normally located behind the slot 31 as is best shown in Fig. 6. When, however, the body of the truck is moved to dumping position, the shaft 59 carries the blades 66 below the slot 31 so that material discharged therethrough drops onto the rotating blades 66 in front of the shaft 59. These blades are arranged so that when the sprocket wheel 58 is connected to the sprocket wheel 56 in the manner shown in Figs. 1, 3, 4 and 5, most of the right-hand blades 66 will throw the material received from the slot 31 to the right and most of the left-hand blades 66 will throw the material they receive to the left. If all the blades were arranged in this manner, there would tend to be a bare space in the center and consequently I prefer to arrange one or more of the blades on the right-hand side and one or more of the blades on the left-hand side so that they throw material to the left and to the right, respectively. In this way I attain uniform distribution.

Nevertheless, the great majority of the blades are arranged so that they throw the material outwardly away from the center line of the truck. When the drive of the shaft 59 is connected, as shown in Figs. 1, 3, 4 and 5, the blades are moving downwardly in front of the shaft 59 which is the location in which the blades engage the falling material to be distributed. Consequently, the material is thrown downwardly, forwardly and outwardly so that the ground below the truck and on each side of the truck receives a substantially uniform coating of material.

The sprocket wheel 56 is freely mounted upon the shaft 43. Beyond the sprocket wheel 56 the shaft 43 is rigidly secured to a hub 67 which is provided with arms 68. The arms 68 are connected to lugs 69 on the sprocket wheel 56 by means of arcuate rods 70 provided at their ends with heads or nuts which maintain the arms 68 from separation from the lugs 69.

Between the arms 68 and the lugs 69 the rods 70 are provided with coil springs 71 which tend to separate the arms 68 from the lugs 69 as far as permitted by the heads and nuts of the rods 70. This structure provides a resilient drive between the shaft 43 and the sprocket wheel 56.

Along shaft 43, within the box-like housing provided by my distributor, are mounted a series of agitating members 72 which serve to agitate the material above the slot 31 so that this material feeds out through the slot continuously. In the embodiment illustrated in Figs. 6, 7 and 11, which is intended primarily for the distribution of finely divided or granular material, such as lime, limestone, sand, and the like, the agitating members 72 may suitably consist of castings having flange portions 72' which are oblique relative to the longitudinal direction of the shaft 43. It will readily be understood that as the shaft 43 rotates, such finely divided or granular material is fed continuously to the slot 31. The castings 72 are provided with openings through which extend rods 73 so as to constitute the castings 72 into a single assemblage rigidly carried by the shaft 43.

I prefer to provide my improved distributor with means for agitating the material above the agitators 72 so as to prevent any tendency for material to bridge around the agitators 72. In the embodiment of the invention shown in Figs. 1 to 12, this anti-bridging agitator may consist of a transverse plate 74 (Fig. 11) which is supported by two angle members 75 from the intermediate crank portion 76 of a shaft 77.

The shaft 77 is rotatably mounted in suitable bearings 78 in arms 79 secured to the upper ends of the side wall elements 41. It will readily be understood that as the shaft 77 is rotated, the transverse plate 74 moves upwardly and downwardly, and any tendency for the pulverulent or granular material to bridge around the agitating members 72 is effectively prevented.

As best shown in Fig. 7, the upper agitator moves upwardly and downwardly over the inner surface of the panel 27. In addition to the transverse plate, this upper agitator may comprise an upper horizontal bar 80 and vertical members 81 connecting the plate 74 to the bar 81. It will of course be understood that the upper agitator may include any kind of frame which may be suitable for the purpose.

Thus, in the case of a distributor intended more particularly for use in the distribution of soft or adhesive material, I prefer to make the upper agitator in the form of a substantially complete panel which prevents the material from working in behind the upper agitator during distribution. For this purpose also I prefer to increase the throw of the crank constituted by the portion 76 of the shaft 77. In other respects the upper agitator may be arranged substantially in the manner shown in Fig. 11.

The shaft 77 carries a sprocket wheel 83 which is operatively connected to a sprocket 84 on the shaft 59 by means of a chain 85. For limited distribution of material, the sprocket wheel 56 is connected to the sprocket wheel 58 by the chain 57 which extends around both of these sprocket wheels. Consequently, the shaft 59 is driven during such operation in clockwise direction, as viewed from the right. This method of driving is particularly suitable for distributing gravel and similar material on roads, and for distributing very finely divided material, such as phosphate, which is expensive and apt to be carried away by the air.

For most purposes, however, a wider distribution is required. I provide on the shaft 59 at the end remote from the sprocket wheel 58 another sprocket wheel 86. To adapt the machine for wide distribution, the bearings 60 and 65 are opened up and the shaft 59 is swung through an angle of 180 degrees, bringing the sprocket wheel 86 into the position of the sprocket wheel 58 shown in Fig. 1, the bearings 60 and 65 are again reassembled and the shaft 59 is now in the relation shown in Fig. 12. The chain 57 is removed and a chain 87 is passed around the sprocket wheel 86 and an idler sprocket wheel 88 which is mounted on a bracket 89 carried by the distributor. One bight of the chain 87 is arranged so that it engages the sprocket wheel 56 in the manner shown in Fig. 12.

It will readily be understood that the direction of rotation of the sprocket wheel 56 is clockwise and that the direction of rotation of the sprocket wheel 86 and the shaft 59 will be counterclockwise, that is, the shaft 59 will rotate in the opposite direction from its direction of rotation when connected as shown in Fig. 1. The result is that the blades 66 move upwardly in the position in front of the shaft 59 and consequently the material is thrown outwardly by most of the blades on the shaft 59, and since it is thrown upwardly by these blades, the degree of distribution is naturally a large area behind the truck and for a substantial area on each side of the truck.

When distributing gravel and other granular material upon roads, it is in almost all cases desired to provide a sharp limit for the distribution of the material. For this purpose I prefer to provide a shield 90 on both sides, or on one side, usually the right-hand side, of the truck. This shield is shown in Fig. 16. It may be constituted by a plate of suitable size located in the longitudinal direction of the truck, arranged to be close to the ground, and arranged to be substantially in alignment with the shaft 59 and the blades 66 when the body is hoisted into distributing position. This arrangement is shown in Fig. 16.

The plate 90 may be secured by means of a bracket 91 to a rod 92. This rod is arranged to extend part way into a horizontal tube 93 carried by depending brackets 94 which are mounted on the rear end of the truck chassis. It is preferred to provide means whereby the plates 90 may be dismounted when not in use. For this purpose I mount on the rod 92 a collar 95 which collar is provided with an arm 97.

The arm 97 extends radially in the same direction as the major portion of the plate 90. The arm 97 is adapted to be engaged by a hook formation 98 suitably provided on the adjacent bracket 94. As best seen in Fig. 17, the weight of the plate 90 holds the arm 97 in the hook formation 98 during use. To remove the plate 90, it is merely necessary to rotate it slightly in the clockwise direction, as viewed in Fig. 17, and then to pull the plate outwardly, removing the rod 92 completely from the tube 93. The effective location of the plate 90 may very readily be adjusted by releasing the set screw 99 which holds the collar 95 in position, readjusting the collar 95 and securing it in its new position.

In Figs. 13 and 14 I show a somewhat modified form of distributor which is particularly intended for use in spreading marl and similar material. Marl is a relatively soft deposit usually taken from dried-up lake beds and it is a type of material which frequently contains roots and fibrous material. It is very desirable for good distribution that such roots and fibrous material should be cut up into small pieces.

For the purpose of distributing material of this kind, I prefer to provide a lower agitator, that is, an agitator which is immediately above the slot 31 in the form shown in Figs. 13 and 14. This agitator comprises a cylinder 100 which is rigidly mounted on the shaft 43. Rods 101 project outwardly from the cylinder 100 and serve to agitate the material above the slot 31. As best seen in Fig. 14, the rods 101 extend obliquely away from their direction of movement. Thus, referring to Fig. 14, the cylinder 100 is rotating in the clockwise direction and the rods 101 are bent away from the radial direction in the counterclockwise direction.

As best shown in Fig. 13, the rods 101 may suitably be arranged in a plurality of circumferential series. Some of the rods, for example the upper and lower rods shown in Fig. 13, lie in radial planes with respect to the cylinder 100. Others of each series are deflected to the left while still others are deflected to the right. In this way the agitating effect of the rods 101 is effective over substantially the whole width of the distributor.

In order to cut the fibers of the material, I prefer to provide knife means driven simultaneously with the rest of the mechanism of the distributor. In the embodiment of the invention shown in Fig. 13, this knife may comprise a blade 102 which extends substantially the width of the distributor and is supported from a shaft 103 by arms 104. The shaft 103 is mounted on bearings on the side walls of the distributor and rigidly carries a sprocket wheel 105 which is driven by a chain 106. The chain 106 extends over a sprocket wheel 107 rigidly mounted on one end of the shaft 43.

With reference to Fig. 14, it is to be noted that the knife 102 comes into close proximity to the outer ends of the rods 101 and thus is adapted to sever all fibrous material which may be located adjacent these rods.

The rearward slope of the rods 101 relative to their direction of movement facilitates the natural cleaning of these rods so that the fibrous material caught thereon may slide outwardly therefrom. I prefer to provide cleaning fingers 114 for the purpose of removing the fibrous material from the rods 101. The fingers 114 are preferably rigidly mounted on the angular member 29 and extend forwardly therefrom between adjacent rods 101 into close propinquity to the cylinder 100. The forward ends of the fingers 114 are preferably located so as to be immediately above the outlet 31 when the truck body is in hoisted position, as shown in Fig. 14.

The knife 102 likewise serves to agitate the material above the lower agitator constituted by the cylinder 100 and the rods 101 so that bridging above this agitator is substantially prevented. The knife 102 and its associated arms 104 fulfill to a considerable extent the anti-bridging function of the upper agitator previously described, which comprises the elements 74, 75, 76, 80 and 81.

In the case of some marls it is preferred to increase the agitation above the lower agitator so as to prevent any possibility of bridging above that agitator. This may be done conveniently by providing a knife 115 similar to the knife 102 and mounted immediately above it as shown in Figs. 13 and 14. The knife 115 may be mounted by means of arms 116 on a shaft 117. The shaft 117 is parallel to the shaft 103 and is supported on bearings on the side walls of the distributor. The knife 115 is driven simultaneously with the knife 102 by means of a chain 118 and sprocket wheels 119 and 120 on the shafts 117 and 103, respectively.

The embodiment of the invention shown in Fig. 15 is a slight modification of the general structure shown in Figs. 13 and 14. This particular modification is more suitable for spreading manure. The lower agitator may be substantially similar to that of the modification of Figs. 13 and 14, comprising a cylinder 100 carrying rods 101, this cylinder being rigidly mounted on the shaft 43 so as to be driven during distribution.

Figure 11:
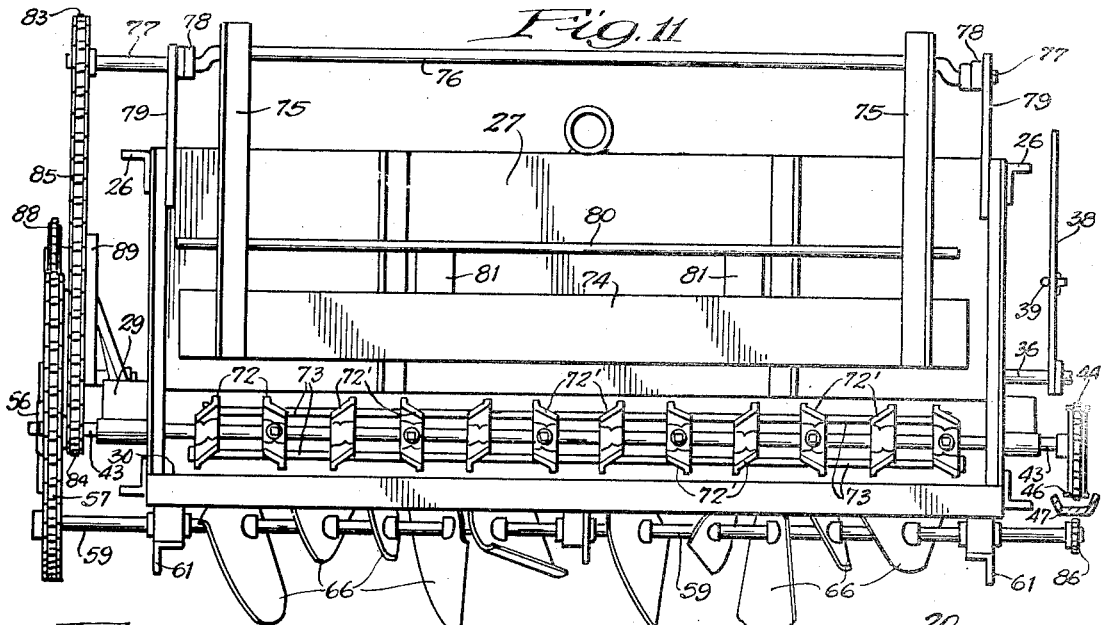
Fig. 11 is an elevational view of my improved distributor shown removed from the truck and viewed from the front.
Figure 12:
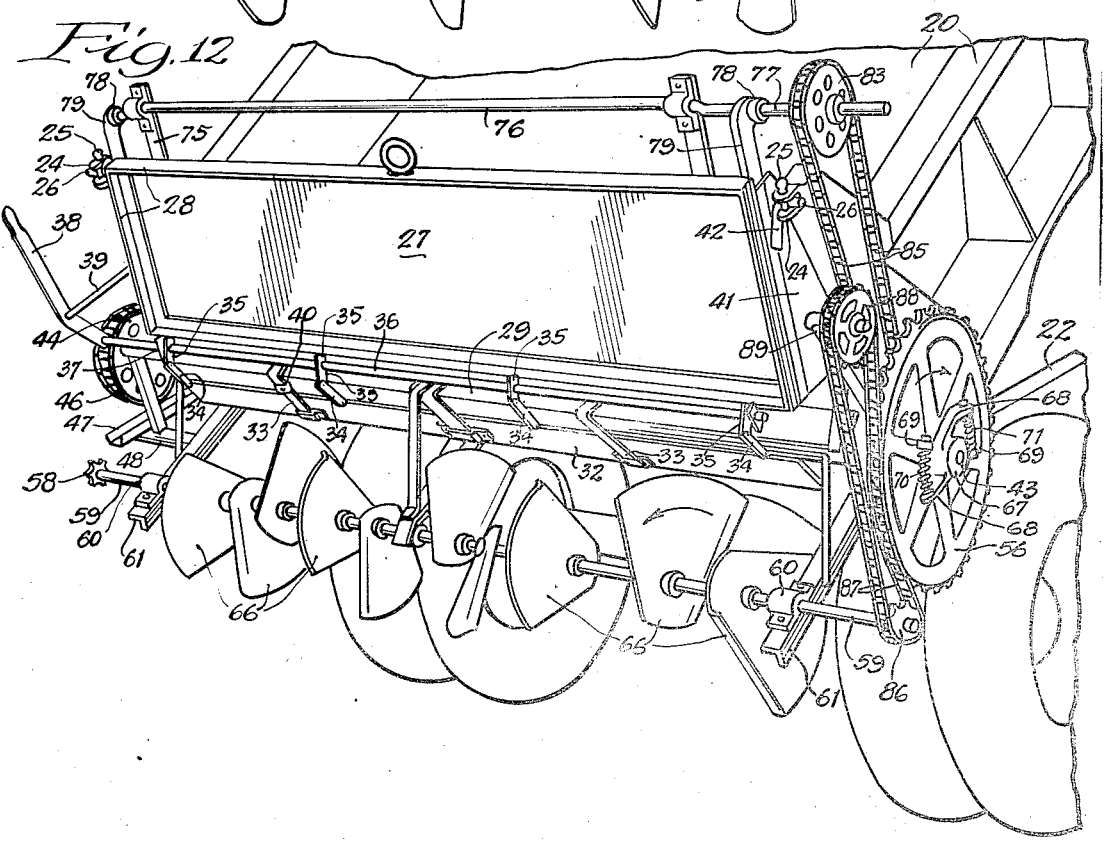
Fig. 12 is a view similar to Fig. 1, showing a modified arrangement of the distributor for distribution of material in a limited path.

I find it advantageous to employ an upper agitator of the same general type as that shown in Fig. 11. This upper agitator comprises a crank arm 76 rotatably mounted in bracket 79. This upper agitator comprises downwardly extending bars 75, the upper ends of which are pivotally carried on the crank arm 76. The lower ends of the bars 75 carry a transverse plate 74. This plate may be spaced from the panel 27 by means of suitable links 108 pivotally connected to the plate 74 and to the panel 27 or stationary means such as angle members 109 mounted thereon.

The plate 74 may suitably carry a large number of pins or rods 110 which extend outwardly and downwardly from the plate so as to be in oblique relation thereto. When spreading manure or other fibrous material, the crank 76 is driven in the same manner as previously described so that the bars 75, plates 74 and pins 110 move upwardly and downwardly towards and away from the lower agitator rods 101. Thus the fibrous material is positively fed downwardly towards these rods which carry it outwardly to the discharge slot 31.

The oblique relation of the pins 110 relative to their motion of travel ensures the positive downward movement of the material. When, however, the pins 110 move upwardly again, the fibrous material is adapted to slide over the downwardly sloping surfaces of the pins.

The embodiment of the invention shown in Figs. 1 to 11 is particularly suitable for the distribution of very finely divided materials such as phosphate. Owing to the extreme state of subdivision, it is preferred in order to prevent excessive loss of air-borne particles, to avoid upward and outward distribution. Consequently, for this purpose it is preferred to connect the blades 66 for rotation in the clockwise direction as viewed from the right. That is, it is preferred to connect the drive of the shaft 59 in the manner shown in Fig. 1. It is further preferred, in the case of this material which is of high price, to provide a shield 111 such as is shown in Fig. 19 around the blades 66. This shield may suitably consist of an arcuate sheet of metal reenforced by suitable angle members 112 and 113 and the shield may be secured to the stationary structure of the distributor in any suitable manner.

It will be understood with reference to Fig. 19, that the bar 113 is quite near the ground and consequently during the distribution of excessively fine material, there is little chance for the material to be widely distributed into the air.

Although the invention has been described in connection with specific details of the preferred embodiment thereof, it must be understood that such details are not intended to be limitative of the invention except in so far as set forth in the accompanying claims.

I claim:

1. A distributor adapted to be mounted on the rear end of a dump truck comprising a structure adapted to be rigidly and pivotally secured to the truck to serve as a distributor or swinging rear door therefor, means on said structure for providing adjacent its lower end a discharge outlet for material to be distributed, a plurality of distributor blades mounted on said structure and adapted to be brought below said outlet when the truck is moved to dumping position, agitating means on the forward side of said structure above said outlet and above the floor of the truck body, agitating means thereabove for preventing bridging and for effecting supply of material to first said agitating means, means operatively connecting said blades, first said agitating means and second said agitating means together, and drive means therefor adapted to connect them operatively to a wheel of the truck.

2. A distributor unit adapted to be mounted on the end of a dump truck and adapted to be removed therefrom as a unit, comprising a structure adapted to serve as an end wall for said truck, means on said structure providing an outlet adjacent the lower end thereof, a sliding plate adapted to close said outlet, lever means adapted to open said outlet at the will of the operator, agitating means mounted on the forward side of said structure wholly above said outlet, distributing blades mounted on said structure behind said outlet and adapted to be brought beneath said outlet when the truck body is moved to dumping position, means operatively connecting said agitating means and said distributing blades together and drive means whereby they may be operatively connected to a wheel of the truck.

3. In combination, a dump truck, a distributor mounted on the rear end thereof and adapted to distribute material from the truck, means on said distributor providing an outlet near the bottom of the truck, distributing blades on said distributor adapted to cooperate with the material flowing from said outlet when the body of the truck is in dumping position, regulative means for controlling said outlet, removable means for operatively connecting said distributor to a wheel of the truck, pivot means for supporting the upper end of said distributor on the body of the truck, and latch means for securing the lower end of said distributor to the body of the truck whereby on opening said latch means said distributor may be free to operate as a conventional truck gate.

4. A distributor adapted to be mounted on the rear end of a dump truck comprising a structure adapted to serve as a closure for the rear end of the truck body, means providing an opening for discharge of material from the truck, a rotary agitator on said distributor above said opening, distributing blades on said distributor adapted to be brought below said opening by the movement of the truck body to dumping position, a reciprocatory agitator above first said agitator, means operatively connecting said distributor blades and said agitators together, and drive means adapted to connect same to the wheel of the truck.

5. A distributor adapted to be mounted on the rear end of a dump truck comprising a structure adapted to serve as a closure for the rear end of the truck body, means providing an opening for discharge of material from the truck, a rotary agitator on said distributor above said opening, distributing blades on said distributor adapted to be brought below said opening by the movement of the truck body to dumping position, a sliding plate adapted to close and open said opening, and manual means operable by an operator in the cab of the truck for moving said plate to opening and closing position, a reciprocatory agitator above first said agitator, means operatively connecting said distributor blades and said agitators together, and drive means adapted to connect same to the wheel of the truck.

6. In combination, a truck, means for discharging material from said truck to permit the same to fall by gravity, an assemblage of blades in the path of said falling material, means for rotating said assemblage blades to distribute the falling material, most of the blades on each side being arranged to throw the material rearwardly and outwardly towards that side, said assemblage being reversible longitudinally, and means for driving said assemblage, when reversed longitudinally, in the opposite direction, whereby discharged material may be distributed outwardly and forwardly.

7. In combination, a truck adapted to discharge material at the rear end thereof whereby said material may descend by gravity, an assemblage of blades rotatably mounted on the rear end of the truck adapted to move through the path of said falling material, means operatively connecting said assemblage to the wheel of the truck whereby said blades are operated as the truck moves forwardly, said connecting means being reversible whereby the blades may be driven in either direction and said assemblage being reversible end for end, the relation of said blades being such that material is distributed thereby rearwardly and outwardly when driven in one direction and forwardly and outwardly when driven in the opposite direction.

8. A distributor adapted to be mounted on the rear end of a dump truck comprising a structure serving as a closure for said truck, an assemblage of distributor blades behind said structure, means on said structure providing a discharge opening for material from said truck, said blades being adapted to move into the path of said discharging material, adjustable closure means for said opening, means on said structure for agitating material above said opening, an agitating frame above first said agitating means, crank means supporting said agitating frame, and means connected to a wheel of the truck for actuating said distributor blades, first said agitating means, and said agitating frame.

9. A distributor adapted to be mounted on the rear end of a dump truck comprising a structure serving as a closure for said truck, an assemblage of distributor blades behind said structure, means on said structure providing a discharge opening for material from said truck, said blades being adapted to move into the path of said discharging material, adjustable closure means for said opening, agitating means on the forward side of said structure wholly above said opening, rotary cutting means above said agitating means, and means connected to a wheel of the truck for actuating said distributor blades, first said agitating means, and said rotary cutting means.

10. A distributor adapted to be mounted on the rear end of a dump truck comprising a structure serving as a closure for said truck, an assemblage of distributor blades behind said structure, means on said structure providing a discharge opening for material from said truck, said blades being adapted to move into the path of said discharging material, adjustable closure means for said opening, agitating means on the forward side of said structure wholly above said opening comprising a cylindrical member having projecting pins thereon, certain of said pins extending in radial planes, certain of said pins being deflected to the left from said radial planes, and certain of said pins being deflected to the right from said planes, and means connected to a wheel of the truck for actuating said agitating means and said distributor blades.

11. A distributor adapted to be mounted on the rear end of a dump truck comprising a structure serving as a closure for said truck, an assemblage of distributor blades behind said structure, means on said structure providing a discharge opening for material from said truck, said blades being adapted to move into the path of said discharging material, adjustable closure means for said opening, agitating means on the forward side of said structure wholly above said opening comprising a cylindrical member having projecting pins thereon, certain of said pins extending in radial planes, certain of said pins being deflected to the left from said radial planes, and certain of said pins being deflected to the right from said planes, rotary cutting means above said agitating means, and means connected to a wheel of the truck for actuating said agitating means, said distributor blades and said rotary cutting means.

12. In a distributor adapted to be mounted on the rear end of a truck, means providing a discharge opening, an agitator above said opening comprising a rotary member having projecting pins, stationary cleaning members located between said pins, and a pair of cutting agitating means located above first said agitator, means operatively connecting said agitator and said agitating means together for simultaneous operation, and means for driving said agitator and agitating means.

13. A distributor unit adapted to be mounted on the end of a dump truck and adapted to be removed therefrom as a unit comprising a structure adapted to serve as an end wall for said truck, means on said structure providing an outlet adjacent the lower end thereof, a closure member adapted to close said outlet, manual means adapted to open said outlet at the will of the operator, agitating means mounted on the forward side of said structure wholly above said outlet, distributing blades mounted on said structure behind said outlet and adapted to be brought beneath said outlet when the truck body is moved to dumping position, means operatively connecting said agitating means and said distributing blades together and drive means whereby they may be operatively connected to a wheel of the truck.

14. A distributor unit adapted to be mounted on the end of a dump truck and adapted to be removed therefrom as a unit comprising a structure adapted to serve as an end wall for said truck, means on said structure providing an outlet adjacent the lower end thereof, a closure member adapted to close said outlet, manual means adapted to open said outlet at the will of the operator, agitating means mounted on the forward side of said structure wholly above said outlet, distributing blades mounted on said structure behind said outlet and adapted to be brought beneath said outlet when the truck body is moved to dumping position, means operatively connecting said agitating means and said distributing blades together and drive means whereby they may be operatively connected to a wheel of the truck, said drive means comprising a sprocket connected to a truck wheel, a sprocket connected to said agitating means, and a sprocket connected to said distributing blades, and chain means for connecting said sprockets to be driven together.

15. A distributor unit adapted to be mounted on the end of a dump truck and adapted to be removed therefrom as a unit comprising a structure adapted to serve as an end wall for said truck, means on said structure providing an outlet adjacent the lower end thereof, agitating means mounted on the forward side of said structure wholly above said outlet, distributing blades mounted on said structure behind said outlet and adapted to be brought beneath said outlet when the truck body is moved to dumping position, means operatively connecting said agitating means and said distributing blades together and drive means whereby they may be operatively connected to a wheel of the truck.

16. A distributor unit adapted to be mounted on the end of a dump truck and adapted to be removed therefrom as a unit comprising a structure adapted to serve as an end wall for said truck, means on said structure providing an outlet adjacent the lower end thereof, agitating means mounted on the forward side of said structure wholly above said outlet, distributing blades mounted on said structure behind said outlet and adapted to be brought beneath said outlet when the truck body is moved to dumping position, said distributing blades being mounted for rotation in the path of said outlet, means operatively connecting said agitating means and said distributing blades together and drive means whereby they may be operatively connected to a wheel of the truck.

17. In combination, a dump truck, a distributor unit mounted on the rear end thereof and adapted to distribute material from the truck, means on said distributor providing an outlet near the bottom of the truck, distributing blades on said distributor adapted to cooperate with the material flowing from said outlet when the body of the truck is in dumping position, said distributing blades being mounted for rotation in the path of said outlet, regulative means for controlling said outlet, means for operatively connecting said distributor to a wheel of the truck, pivot means for supporting the upper end of said distributor on the body of the truck, and means for securing the lower end of said distributor to the body of the truck whereby on opening said latter means said distributor may be free to operate as a conventional truck gate.

18. In combination, a dump truck, a distributor unit mounted on the rear end thereof and adapted to distribute material from the truck, means on said distributor providing an outlet near the bottom of the truck, distributing blades on said distributor adapted to cooperate with the material flowing from said outlet when the body of the truck is in dumping position, said distributing blades being mounted for rotation on said unit below said outlet when in dumping position, regulative means for controlling said outlet, means for operatively connecting said distributor to a wheel of the truck, pivot means for supporting the upper end of said distributor on the body of the truck, and means for securing the lower end of said distributor to the body of the truck whereby on opening said means said distributor may be free to operate as a conventional truck gate.

19. In combination, a dump truck, a distributor unit mounted on the rear end thereof and adapted to distribute material from the truck, means on said distributor providing an outlet near the bottom of the truck, distributing blades on said distributor adapted to cooperate with the material flowing from said outlet when the body of the truck is in dumping position, said distributing blades being mounted for rotation in the path of said outlet, regulative means for controlling said outlet, means for operatively connecting said distributor to a wheel of the truck, pivot means for supporting the upper end of said distributor on the body of the truck, and means for securing the lower end of said distributor to the body of the truck whereby on opening said latter means said distributor may be free to operate as a conventional truck gate, said means for operatively connecting said distributor to a wheel of the truck comprising a plurality of sprockets, one of which is carried by the truck wheel, and connecting chains for driving said sprockets.

ALLEN R. FLINK.